United States Patent [19]

Buuck

[11] 4,412,265

[45] Oct. 25, 1983

[54] INTRINSIC BARRIER

[75] Inventor: Frederick A. Buuck, Fort Wayne, Ind.

[73] Assignee: Tokheim Corporation, Ft. Wayne, Ind.

[21] Appl. No.: 325,500

[22] Filed: Nov. 27, 1981

[51] Int. Cl.³ .............................................. H02H 3/20
[52] U.S. Cl. .................................... 361/18; 361/56; 361/91
[58] Field of Search ................... 361/2, 10, 11, 54, 56, 361/58, 91, 106, 110, 111, 18; 307/540, 544; 323/311, 312, 314, 304, 908

[56] References Cited

U.S. PATENT DOCUMENTS 3,878,434  4/1975  Voorhoeve .................... 361/111 X
3,955,132  5/1976  Greenwood .................... 361/56 X
3,968,472  7/1976  Taylor .......................... 361/56 X

OTHER PUBLICATIONS

Motorola-Zener/Rectifier Handbook pp. 38–41.

Primary Examiner—Harry E. Moose, Jr.
Attorney, Agent, or Firm—David A. Lundy

[57] ABSTRACT

An intrinsic barrier made up of active and passive electrical components which combine to maintain the power in the output lines below a predetermined level in order to prevent the possibility of explosion if the output lines or any circuit electrically connected therewith comes in contact with a potentially explosive atmosphere. Specifically, the intrinsic barrier includes a transistor and a first zener diode combination which serve as a source of controlled voltage to the output lines of the barrier and which combination is protected on the input end by a fuse and also protected on the output end of the barrier by two zener diodes having voltage ratings equal to or greater than the first zener diode mentioned and also having, under prescribed test conditions, destruction times which are significantly greater than the blow time of the fuse and which output line further contains a resistor which has been selected such that the energy level is maintained at a safe level.

11 Claims, 4 Drawing Figures

INTRINSIC BARRIER

BACKGROUND OF THE INVENTION

The present invention broadly relates to electrical circuitry which maintains the power in the output lines of such circuitry below a predetermined level in order to prevent the possibility of explosion if these output lines or any circuit electrically connected therewith comes in contact with a potentially explosive atmosphere.

Intrinsically safe apparatus or circuits are ones in which any spark or thermal effect produced either normally or under prescribed test conditions is incapable of causing ignition of a flammable or combustible material in air in its most easily ignitible concentration. Thus, the definition of "intrinsically safe" must include all circumstances which can reasonably be expected to occur in use of the apparatus or circuit and must include the conditions which arise when internal faults occur in the system. There are a number of independent or governmental testing or certifying organizations such as Underwriters Laboratories, Inc., Factor Material Engineering and Canadian Standards Association which provide prescribed test conditions for determining if equipment is intrinsically safe.

In the design of intrinsically safe equipment, there will typically be electrical circuitry enclosed in a "safe" environment (e.g. explosion proof housings) and those circuits which extend from this safe environment into a potentially dangerous area where the circuit may come in contact with an explosive atmosphere. These circuits which extend from a safe environment to a potentially dangerous area are typically designed so that they pass through a safety barrier which is designed to limit the power which can enter the circuit. Accordingly, as used herein, the term "intrinsic barrier" is defined as a device which will not permit the transfer of more than a precisely restricted amount of energy from one side of the barrier to the other.

FIG. 1 is one of a series of charts which are published by one of the above mentioned testing organizations. These charts present the minimum igniting currents for specific gases and the testing organization will typically specify that the maximum permissible working current can be a certain percentage of the values shown and thereby resulting in a safety factor. As seen in FIG. 1 the minimum igniting current will depend upon the gas or explosive environment involved. For example, circuit currents falling below the hydrogen curve in area "A" would be considered safe for use in an air-hydrogen environment as well as being safe in air mixed with any of the three other gases shown. However, circuit currents falling between the hydrogen and ethylene curves (i.e. in area B) would be considered safe for an ethylene-air environment but not safe for use in hydrogen and air. Furthermore, it will be seen that the lower the voltage, the greater the current that will be permitted in the circuit without exceeding the minimum safe level. This relationship is important since there is increasing use sophisticated electronic components and microprocessors have relatively high current requirements, and to have these components operate in, for example, the environments listed in FIG. 1, it becomes necessary to design intrinsic barriers which will greatly limit the voltage so as to thereby permit the use of larger values of currents.

As a result of this voltage current relationship, designers will generally attempt to reduce the circuit voltage (e.g. to the 15-100 V range in FIG. 1.) in order to facilitate the safe use of relatively higher levels of current to operate the electronic circuitry contemplated. Thus, the design of intrinsic barriers requires the selection and arrangement of individual components to provide the required level of current in the output lines and, at the same time, insure that the current will not surge above a predetermined level in the event of failure of any components in the barrier.

Intrinsic barriers are also typically encapsulated in order to prevent tampering and it is desirable in these encapsulated designs to have means for non-destructively testing selected components in the barrier.

Electronic equipment also frequently requires the use of multiple barriers to protect different circuits and it is highly desirable to provide these barriers stacked together and encapsulated into a single intrinsic barrier. It is also desirable if these individual barriers can be designed to control different levels of voltage.

Prior art barriers have typically included a series of resistors and resistor/zener diode combinations or Redding barriers. However, these essentially passive devices have been found unsuitable for the operation of some electronic and electromechanical equipment. Accordingly, there is a continuing need for an improved intrinsic barrier having combination of active and passive electrical components which facilitates the safe utilization of electronic components in explosive environments. Likewise, there is a need for active intrinsic barriers in producing a source of controlled voltage. As also noted above, there is also a continuing need for intrinsic barriers that are designed to permit the individual testing of the elements in the barrier. Finally, there is a need to provide multiple barriers combined into a single intrinsic barrier and with the individual barriers being capable of controlling different levels of voltage.

SUMMARY OF THE INVENTION

The present invention improved upon the intrinsic barriers provided in the prior art by providing a circuit having a unique combination of active and passive electrical components. Specifically, the intrinsic barrier of the invention includes a transistor and a first zener diode combination which serve as a source of controlled voltage to the output lines of the barrier and which combination is protected on the input end by a fuse and also protected on the output end of the barrier by two zener diodes having voltage ratings equal to or greater than the first zener diode mentioned and also having, under prescribed test conditions, destruction times which are significantly greater than the blow time of the fuse.

Accordingly, an object of the invention is to provide an improved intrinsic barrier having a unique combination of electrical components for controlling the electrical energy used in potentially explosive environments.

Another object of the invention is to provide an improved intrinsic barrier which utilizes the combination of active and passive electrical components.

Another object of the invention is to provide an intrinsic barrier having active and passive electrical components and further having a unique relationship between the passive components which serves to always limit the electrical energy output from the barrier.

Still another object of the invention is to provide an intrinsic barrier having a combination of elements that provides a source of controlled output voltage and further having passive elements which protect the output lines in the event of the failure of any of the barrier elements that normally control the output voltage.

Another object is to provide an intrinsic barrier having a circuit design which permits the individual testing of two protective elements in the barrier.

Still another object of the invention is to provide multiple barriers combined together into a single intrinsic barrier which can control circuits having different voltage requirements.

BRIEF DESCRIPTION OF THE DRAWINGS

The above-mentioned and other features and objects of this invention will become more apparent and the invention itself will be best understood by reference to the following detailed description of an embodiment of the invention when considered in conjunction with the accompanying drawings, wherein.

DESCRIPTION OF A PREFERRED EMBODIMENT

Figure 1:
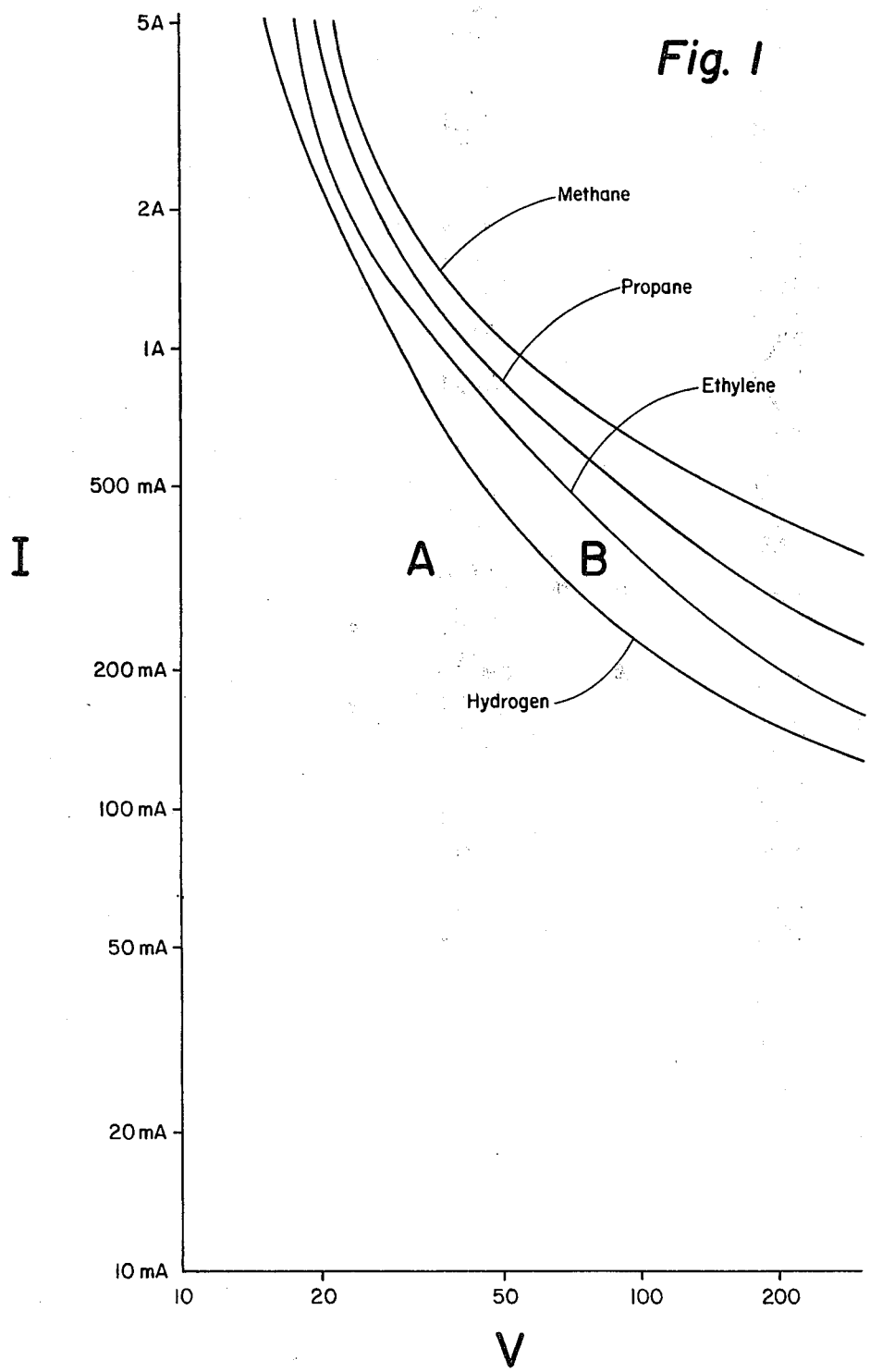
FIG. 1 is a copy of a chart showing the minimum igniting currents for resistive circuits with inductances less than 1 milliheny published by Underwriters Laboratories, Inc. and which chart is applicable to circuits in which cadmium, zinc or magnesium will not be present.
Figure 2:
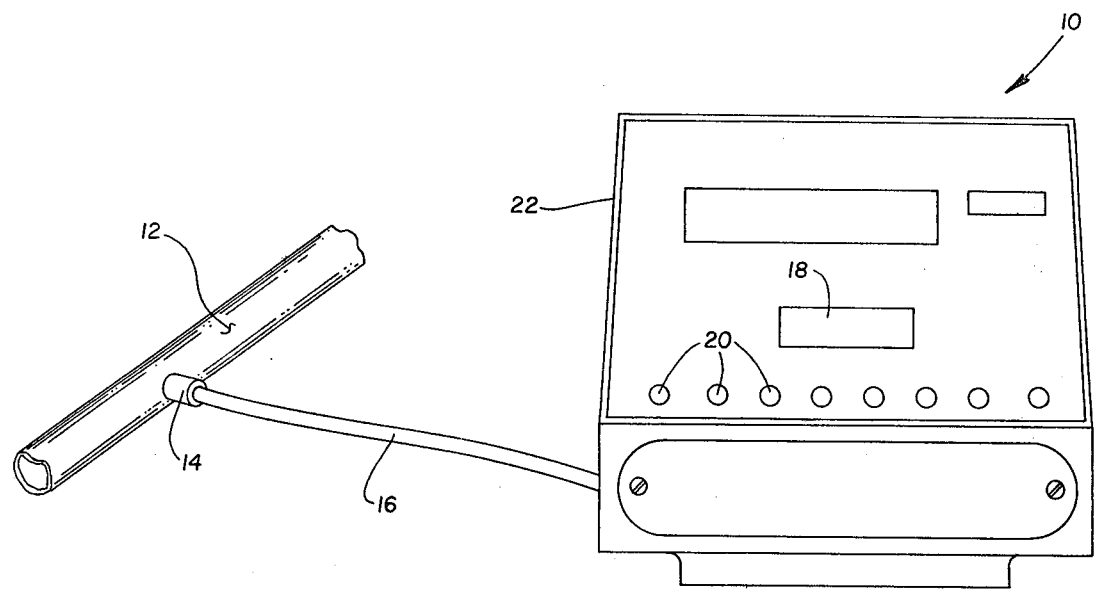
FIG. 2 is a general arrangement view showing a typical arrangement of an electronic register/calibrator incorporating the present invention in safe use for measuring/controlling flow volume of a volatile fuel.

The details of FIG. 1 were described in the Background section above. Referring now to FIG. 2 a typical arrangement is shown wherein one or more of intrinsic barriers of the present invention would typically be employed in an electronic register/calibrator 10 so as to facilitate the safe use thereof in a potentially explosive environment. In this representative application an electronic register/calibrator 10 is designed to accurately record/control volume flow of a liquid fuel through pipe 12. In use a metering device 14 in pipe 12 will be coupled to register/calibrator 10 via line 16 and will be a pulse source which, in turn, generates electrical pulses in response to volume flow. The register/calibrator 10 would contain microcomputer and associated circuitry in a housing, part of which is explosion proof and part of which contains electrical circuitry which can be in a potentially explosive environment. Inputs are made to register/calibrator 10 via switches 20 and output signals generated would actuate displays 18, and could also operate additional control valves or operate additional equipment, not shown. Each of the circuits outside the explosion proof section of the housing would be controlled by an intrinsic barrier of the type detailed below. While the intrinsic barrier of the present invention has application in an electronic register/calibrator of the general type described above, it will be obvious that the present invention can be employed in virtually any electronic equipment where it is desired to ensure that the energy applied to a particular electric circuit does not exceed a predetermined level.

Figure 3:
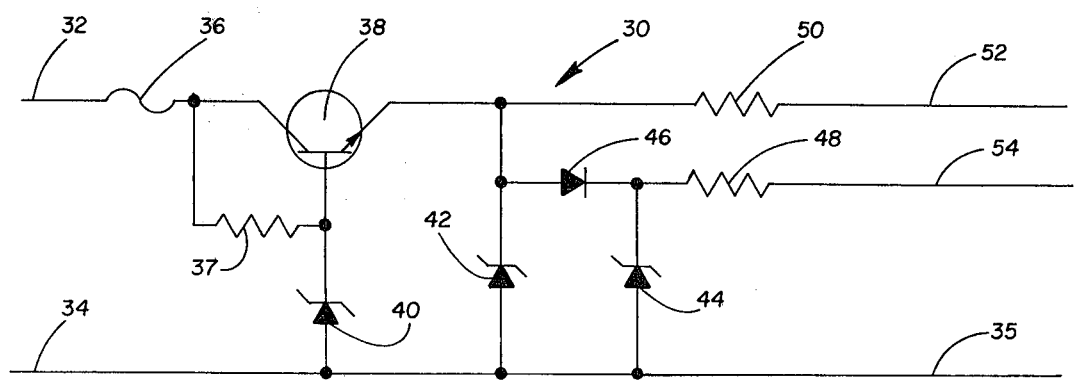
FIG. 3 is an electrical schematic of the circuit comprising the intrinsic barrier.

The specific intrinsic barrier 30 of the present invention is shown in FIG. 3 having input lines 32, 34 and output lines 52, 54, 35. The barrier is located within explosion proof section of housing 22 and output lines 35, 54 extend to a circuit outside the explosion proof section of the housing which is to be energized. Output lines 52, 54, 35 combine to permit testing of zener diode 42 while output lines 54, 35 combine to permit testing of zener diode 44 as will be described below. Lines 34 and 35 combine to form a common ground lead which electrically interconnects the power source and the electric circuit, not shown, which is to be energized by intrinsic barrier 30. Transistor 38 is provided with conventional collector, base and emitter leads. A first zener diode 40 interconnects the base lead of transistor 38 to circuit ground 35. A fuse 36 has a first terminal electrically connected to the power source and a second terminal connected to the transistor's collector lead and through resistor 37 to the transistor's base lead. Fuse 36 is selected to open prior to a short failure of transistor 38. A second zener diode 42 interconnects the emitter lead of transistor 38 with circuit ground 35. A similar third zener diode 44 is series connected to current limiting resistor 48 and to second zener diode 42 through diode 46. A test transistor 50 is connected to the emitter lead of transistor 38 and to zener diode 42.

Second and third zener diodes 42, 44 are selected to have voltage ratings at least equal to or greater than, zener diode 40 but in actual practice have been selected with the voltage rating of second zener diode 42 being substantially equal to the rating of first zener diode 40 and the voltage rating of third zener diode 44 being slightly greater than the ratings for the zener diodes 42. This relationship permits zener diodes 42, 44 to protect the circuit only in the event of failure of transistor 38 or first zener diode 40, as will be described below. Furthermore, the second and third zener diodes are selected so that, under prescribed test conditions the blow time of the fuse is significantly shorter than the destruction time of the zener diodes in order to thereby insure that the fuse must blow before the zener diodes receives a sufficiently large surge current to cause an open circuit.

The resistor 48 in output line 54 is selected with a resistance R, that will limit the output current to a preselected maximum. The resistor 50 is selected with a resistance substantially higher than the resistance of resistor 48 in order that the desired current/voltage relationship can be achieved on output lines 54, 35.

In normal operation of the intrinsic barrier the pass transistor 38 and zener diode 40 combine to regulate voltage on output lines 54, 35 and resistor 48 limits the output current. It will be seen that by regulating both current and voltage in the manner described it is possible to select individual barrier components which will yield safe energy levels at the output end of barrier. Furthermore, as long as components 38, 40 function properly and there are no input power faults, the fuse and zener diodes 42, 44 remain passively in the circuit. In the event of excessive input voltage, which would damage transistor 38, fuse 36 will blow. Furthermore in the event of a short between emitter and collector of transistor 38, or if zener diode 40 opens, then high voltage can appear on the output lines unless they are suitably protected. In either situation, if the voltage on zener diodes 42, 44 exceeds the avalanche level for that particular diode, then the diode becomes conducting and the excessive voltage (i.e. above the avalanche level) is grounded to the common ground lead 35. It should be recognized that zener diodes 42, 44 combine to form a voltage limiting means that is designed for maximum safety and that zener diode 44 is simply a redundant voltage limiter. Accordingly, it is possible to provide the voltage limiting means of the present invention with only one zener diode 42.

Diode 46 is in the circuit in order to permit the individual testing of zener diodes 42, 44 and it should be recognized that it can be eliminated, along with test line 52 and resistor 50, without affecting the performance of the intrinsic barrier. However, if these components are not in the circuit and the circuit was encapsulated, there would be no way of readily, and non destructively, determining if both zener diodes 42, 44 are still functioning properly. If these components are provided in the circuit it will be seen that a test voltage can be applied across lines 54, 35 to check zener diode 44 and then, with a test voltage on line 54 to have diode 46 block line 54, a test voltage can be applied across lines 52, 35 to test zener diode 42.

The combination of these barrier components insure that the energy level on lines 54 and 35 will be maintained below a predetermined safe level before entry into an explosive environment. It will be recognized that the barrier components will have to be selected to limit the output energy to a predetermined level which, in turn, is dictated by the physical characteristics of the potential explosive environments which might be encountered.

Figure 4:
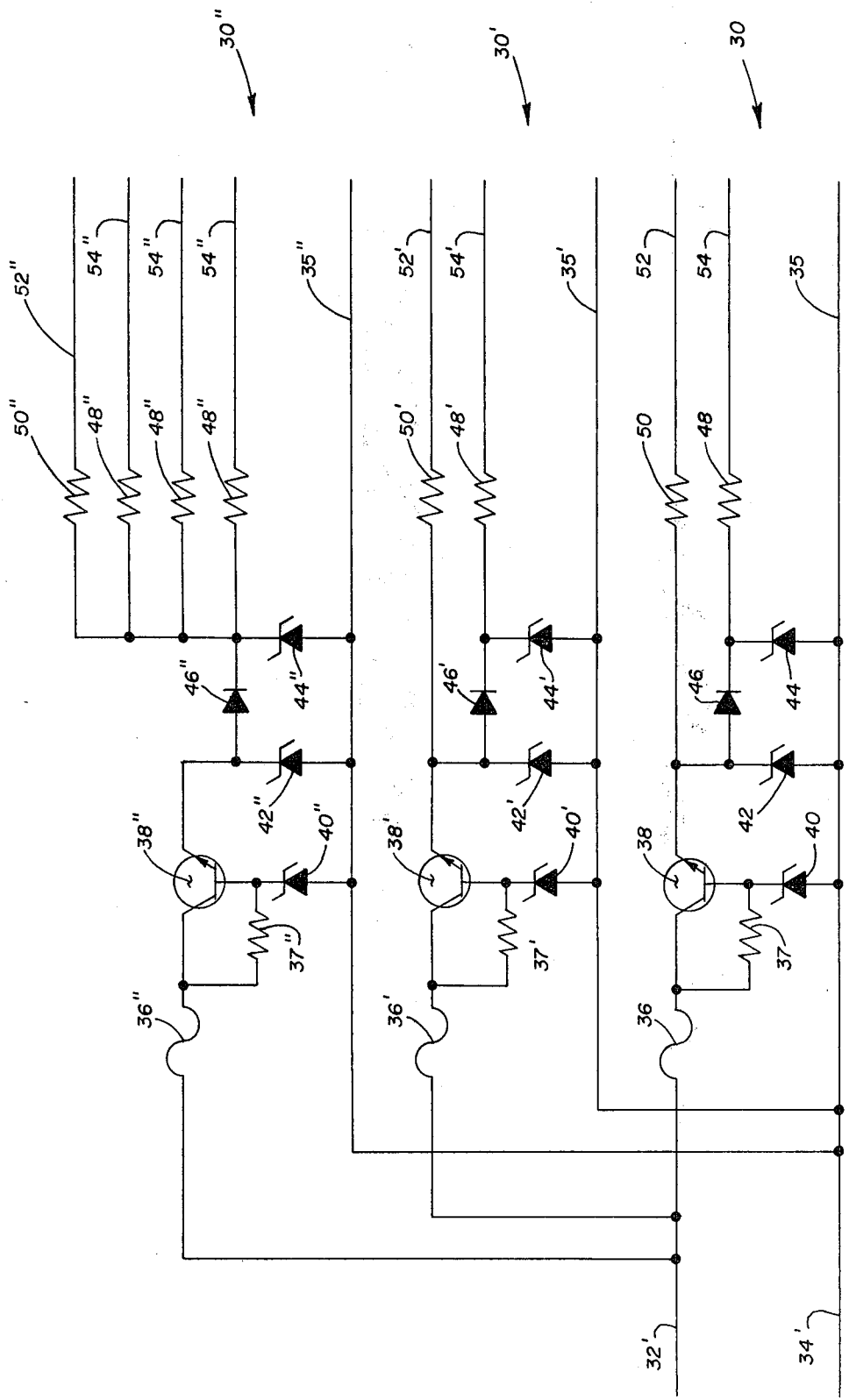
FIG. 4 is an electrical schematic showing three barriers of the present invention stacked together to form an intrinsic barrier.

If additional component barriers are required to control additional electrical circuits in a particular electrical device then the transistors and other electrical components for these barriers would also be selected based on the requirements of the particular circuit being controlled. FIG. 4 disclose one arrangement where barrier 30 shown in FIG. 3 has been stacked with two similar barriers 30' and 30" and these would be typically encapsulated into a single intrinsic barrier. Each one of these barriers 30, 30', 30" would control a separate set of circuits and as seen in barrier 30" there are three output lines 54" which would go to three separate circuits requiring the same protection. The components for each barrier would be selected to provide the voltage current relationship that is dictated by the specific circuit that is to be energized.

While there have been described above the principles of this invention in connection with specific apparatus, it is to be clearly understood that this description is made only by way of example and not as a limitation to the scope of the invention.

What is claimed is:

1. An intrinsic barrier comprising:
   a first and second input lines for receiving input from an electrical source,
   a first and second output lines for electrically connecting electronic circuitry that exists in a potentially explosive environment,
   said second input line and said second output line forming a common lead,
   a transistor having collector, base and emitter leads,
   a fuse electrically connected between said first input line and the collector lead of said transistor,
   a first zener diode interconnecting the base lead of said transistor and said common lead,
   a first resistor electrically series connected in said first output line,
   a voltage limiting means electrically interposed between the emitter lead of said transistor and said common lead; said voltage limiting means also being electrically interposed between said first output line and the emitter lead of said transistor,
   said transistor and said first zener diode combining to function as a regulated voltage source to said first and said second output lines,
   said first resistor being selected to limit the current in said first and said second output lines to a preselected maximum,
   said voltage limiting means limiting the output voltage on said first and said second output lines only in the event that said first zener diode opens or a short occurs between the collector and the emitter leads of said transistor.

2. The intrinsic barrier defined in claim 1 wherein said voltage limiting means comprises:
   a second zener diode electrically connecting the emitter lead of said transistor and said common lead,
   a third zener diode electrically connected at one end thereof to both the emitter lead of said transistor and said first output line and electrically connected at the other end thereof to said common lead to form a redundant voltage limiter.

3. The intrinsic barrier defined in claim 2 wherein the voltage rating of said second zener diode is substantially equal to the voltage rating of said first zener diode and said third zener diode has a voltage rating slightly higher than the voltage rating of said second zener diode.

4. The intrinsic barrier defined in claim 3 wherein said fuse has a blow time under prescribed test conditions which is significantly shorter than the destruction times of said second and said third zener diodes under the same prescribed test conditions.

5. The intrinsic barrier defined in claim 1 wherein said voltage limiting means comprises:
   a second zener diode electrically connected at one end thereof between the emitter lead of said transistor and said first output line and at the other end thereof to said common lead.

6. An intrinsic barrier comprising:
   a first and second input lines for receiving input from an electrical source,
   a first and second output lines for electrically connecting electronic circuitry that is to receive a preselected maximum level of energy,
   said second input line and said second output line forming a common lead,
   a transistor having collector, base and emitter leads,
   a fuse electrically connected between said first input line and the collector lead of said transistor,
   a first zener diode interconnecting the base lead of said transistor and said common lead,
   a second zener diode electrically connecting the emitter lead of said transistor and said common lead,
   a third zener diode electrically connected at one end thereof to both the emitter lead of said transistor and said first output line and being electrically connected at the other end thereof to said common lead,
   a first resistor electrically series connected in said first output line,
   said transistor and said first zener diode combining to function as a regulated voltage source to said first and said second output lines;
   said first resistor being selected to limit the current in said first and said second output lines to a preselected maximum,
   said second and said third zener diodes combining to limit the output voltage on said first and said second output lines in the event that said first zener diode opens or a short occurs between the collector and emitter leads of said transistor.

7. An intrinsic barrier defined in claim 6 wherein:
the voltage rating of said second zener diode is substantially equal to the voltage rating of the said first zener diode and said third zener diode has a voltage rating slightly higher than the voltage rating of said second zener diode.

8. An intrinsic barrier defined in claim 7 wherein:
said fuse has a blow time under prescribed test conditions which is significantly shorter than the destruction times of said second and said third zener diodes under the same prescribed test conditions.

9. An intrinsic barrier defined in claim 6 which further comprises:
a blocking diode electrically interconnected between said second and said third zener diodes, said blocking diode also being electrically interconnected between said first output line and the emitter lead of said transistor.

10. An intrinsic barrier defined in claim 9 which further comprises:
a separate test output line having a second resistor therein,
said second resistor having a resistance which is substantially larger than the resistance of said first resistor in said first output line,
said test output line being connected to the emitter lead of said pass transistor and to said second zener diode whereby individual test voltages can be applied to said second and said third zener diodes.

11. An intrinsic barrier made up of two barriers stacked and encapsulated, each barrier comprising:
a first and second input lines for receiving input from an electrical source,
a first and second output lines for electrically connecting electronic circuitry that is to be protected,
said second input line and said second output line forming a common lead,
a transistor having collector base and emitter leads,
a fuse electrically connected between said first input line and the collector lead of said transistor,
a first zener diode interconnecting the base lead of said transistor and said common lead,
a second zener diode electrically connecting the emitter lead of said transmitter and said common lead,
a third zener diode electrically connected at one end thereof to both the emitter lead of said transistor a resistor electrically series connected in said first output line, and said first output line and being electrically connected at the other end thereof to said common lead,
said transistor and said first zener diode combining to function as a regulated voltage source to said first and said second output lines;
said second and said third zener diodes combining to limit the output voltage on said first and said second output lines in the event that said first zener diode opens or a short occurs between the collector and emitter leads of said transistor,
said resistor being selected to limit the current in said first and said second output lines to a preselected maximum.

* * * * *